(12) United States Patent
Watkinson

(10) Patent No.: US 12,372,301 B2
(45) Date of Patent: Jul. 29, 2025

(54) HEATING ELEMENT, A SYSTEM AND METHOD FOR MELTING MATERIALS USING SAID HEATING ELEMENT

(71) Applicant: GLASSFLAKE LTD, Leeds (GB)

(72) Inventor: Charles Watkinson, Leeds (GB)

(73) Assignee: GLASSFLAKE LTD (GB)

( * ) Notice: Subject to any disclaimer, the term of this patent is extended or adjusted under 35 U.S.C. 154(b) by 961 days.

(21) Appl. No.: 17/603,017

(22) PCT Filed: Apr. 9, 2020

(86) PCT No.: PCT/GB2020/050919
§ 371 (c)(1),
(2) Date: Oct. 12, 2021

(87) PCT Pub. No.: WO2020/208354
PCT Pub. Date: Oct. 15, 2020

(65) Prior Publication Data
US 2022/0187019 A1   Jun. 16, 2022

(30) Foreign Application Priority Data
Apr. 12, 2019   (GB) ..................................... 1905228

(51) Int. Cl.
*F27B 3/08*     (2006.01)
*C03B 5/033*    (2006.01)
(Continued)

(52) U.S. Cl.
CPC ................ *F27B 3/08* (2013.01); *C03B 5/033* (2013.01); *F27D 99/0006* (2013.01); *H05B 3/12* (2013.01);
(Continued)

(58) Field of Classification Search
CPC ......... C03B 5/033; C03B 5/0332; C03B 5/02; C04B 35/653; F27B 3/08;
(Continued)

(56) References Cited

U.S. PATENT DOCUMENTS 3,056,846  A   10/1962   Glaser
4,968,662  A   11/1990   Urano et al.
(Continued)

FOREIGN PATENT DOCUMENTS

CN   201522902 U   7/2010
CN   102648163 A   8/2012
(Continued)

OTHER PUBLICATIONS

Office Action in Russian Application No. 2021129478 dated Jul. 26, 2023.
(Continued)

*Primary Examiner* — Quang T Van
(74) *Attorney, Agent, or Firm* — Bell & Manning LLC

(57) ABSTRACT

A heating element for use in a system for melting materials during the production of a glass or ceramic material may include a first coupling member which may couple to a first side of the interior of a melt tank; a second coupling member which may couple to a second side of the interior of the melt tank; and at least one elongate strip extending between the first coupling member and the second coupling member. The at least one elongate strip is integral with the first coupling member and the second coupling member. During a heating operation, current may flow between the first coupling member and the second coupling member of the heating element, along the at least one elongate strip to thereby radiate heat to materials located within the interior of the melt tank.

15 Claims, 5 Drawing Sheets

(51) Int. Cl.
*F27D 99/00* (2010.01)
*H05B 3/12* (2006.01)

(52) U.S. Cl.
CPC .... *C03B 5/0332* (2013.01); *F27D 2099/0008* (2013.01); *H05B 2203/003* (2013.01); *H05B 2203/016* (2013.01); *H05B 2203/025* (2013.01); *H05B 2203/032* (2013.01)

(58) Field of Classification Search
CPC ......... F27D 2099/0008; F27D 99/0006; H05B 2203/003; H05B 2203/016; H05B 2203/025; H05B 2203/032; H05B 3/12; H05B 3/24; Y02P 40/50
USPC .... 373/27, 36, 39, 41, 82, 88; 219/678–763; 65/441, 488, 376, 540
See application file for complete search history.

(56) References Cited

U.S. PATENT DOCUMENTS 5,569,312 A * 10/1996 Quirk ...................... C03B 5/235
  110/212
9,242,884 B2 * 1/2016 Hemmann ................ C03B 5/24

FOREIGN PATENT DOCUMENTS

| | | | |
|---|---|---|---|
| GB | 615760 | A | 1/1949 |
| JP | H02199030 | A | 8/1990 |
| JP | H04331722 | A | 11/1992 |
| JP | 0891848 | A | 4/1996 |
| RU | 2050339 | C1 | 12/1995 |
| RU | 2086862 | C1 | 8/1997 |
| RU | 137649 | U1 | 2/2014 |
| SU | 749802 | A1 | 7/1980 |
| UA | 17730 | A | 10/1997 |
| WO | WO 03/049502 | A1 | 12/2003 |
| WO | WO 2018/129417 | A1 | 7/2018 |
| WO | WO 2019/244802 | A1 | 12/2019 |

OTHER PUBLICATIONS

Search Report in Russian Application No. 2021129478 completed Jul. 21, 2023.
Tehnologija èlektrovakuumnoî i radiotehničskoî keramiki GV Belinskaja, GA Vydrik—1977—Ènergija.
Japanese Unexamined Patent Application, First Publication No. H01-167237, Jun. 30, 1989; pp. 1-5.
Japanese Unexamined Patent Application, First Publication No. S51-64023, Sep. 25, 1975; pp. 145-155.
Chinese Patent Application, Publication No. 106865953 A, Jun. 20, 2017; pp. 1-5.
Japanese Unexamined Patent Application, First Publication No. 2019-53981, Apr. 4, 2019; pp. 1-43.
Japanese Unexamined Patent Application, First Publication No. 2011-38683, Feb. 24, 2011; pp. 1-8.
Chinese Patent Application, Publication No. 108458589, Aug. 8, 2018; pp. 1-16.
International Search Report and Written Opinion from Application No. PCT/GB2020/050919 dated Jun. 25, 2020.
UK Search and Exam Report from Application No. GB1905228.1 dated Sep. 27, 2019.
Office Action from Chinese Application No. 202080027738.0 dated Jun. 29, 2023.
Office Action from Chinese Application No. 202080027738.0 dated Feb. 9, 2023.

* cited by examiner

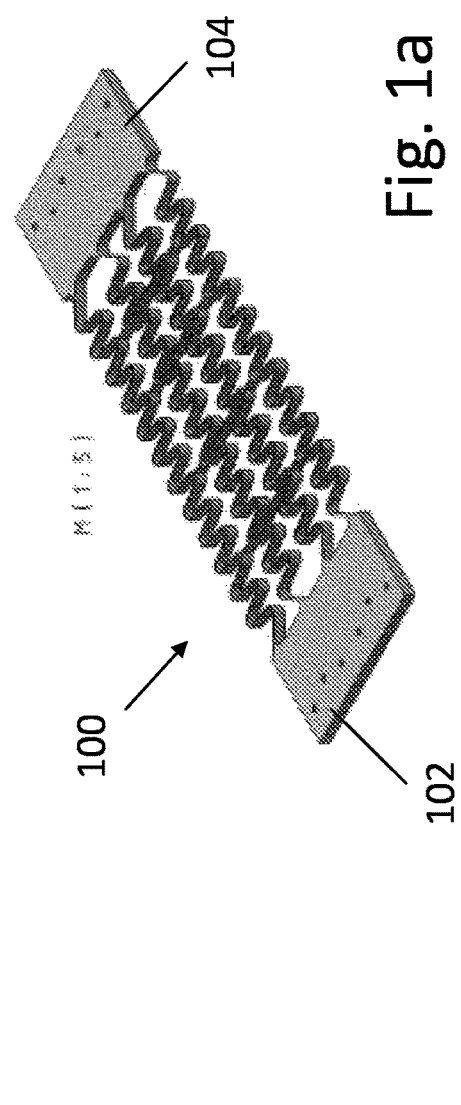
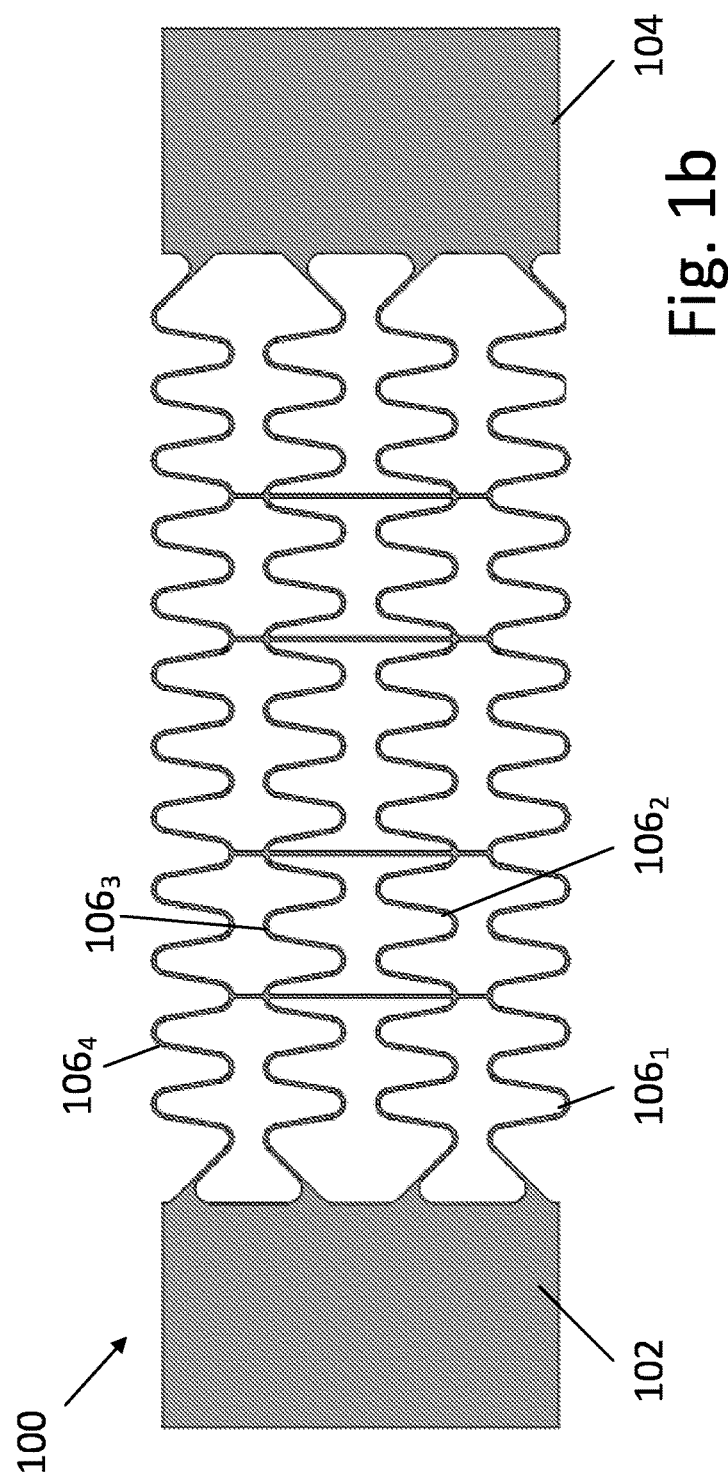

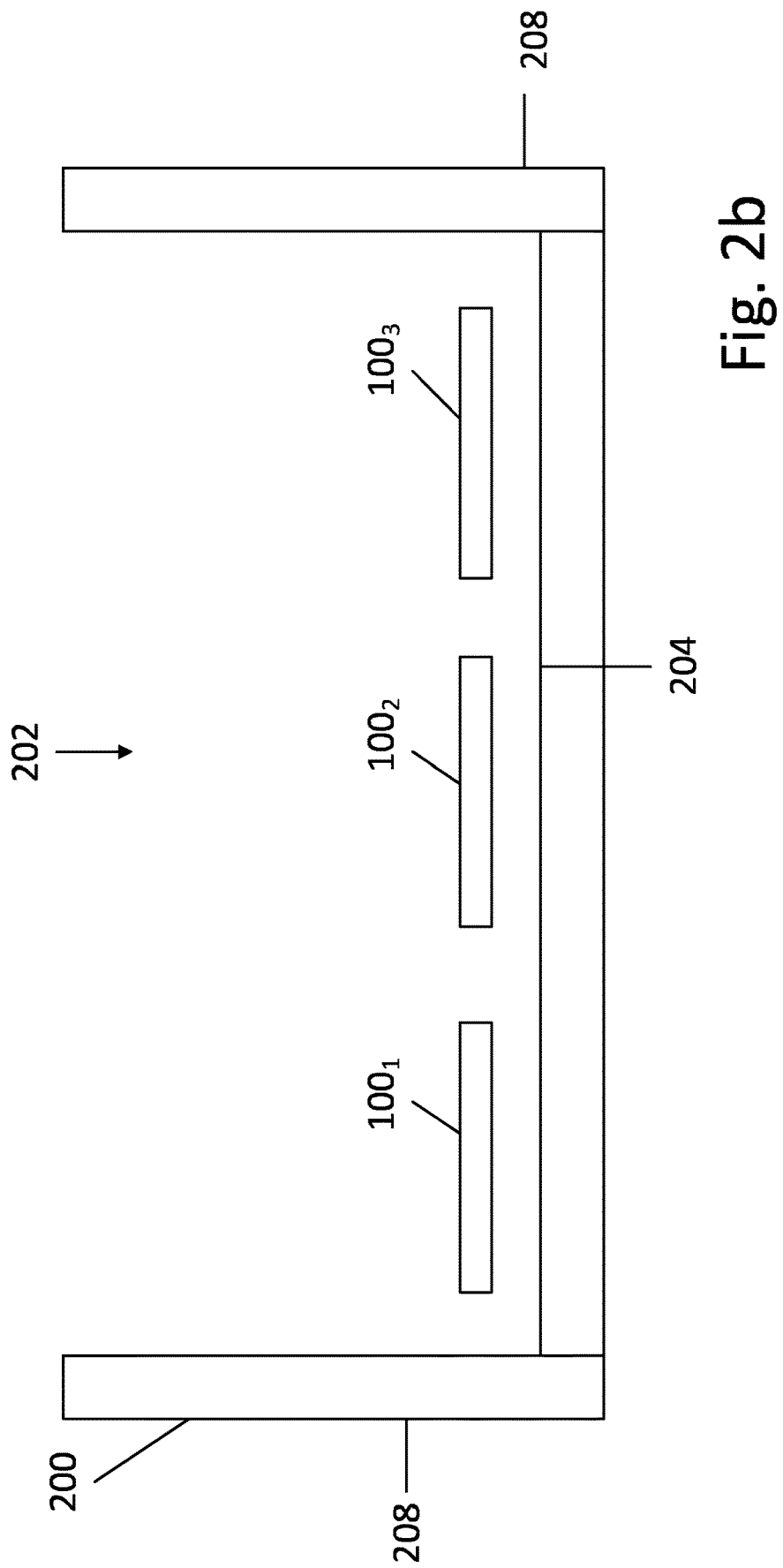

HEATING ELEMENT, A SYSTEM AND METHOD FOR MELTING MATERIALS USING SAID HEATING ELEMENT

CROSS-REFERENCE TO RELATED APPLICATIONS

This application is a § 371 national stage of International Application PCT/GB2020/050919, with an international filing date of 9 Apr. 2020, which International Application claims the benefit of GB 1905228.1, filed on 12 Apr. 2019, the benefit of the earlier filing date of which is hereby claimed under 35 USC § 119(a)-(d) and (f). The entire contents and substance of all applications are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

This invention relates generally to system and method for melting materials during the production of a glass or ceramic material.

2. Description of Related Art

Conventional electrical melting of glass (or similarly some ceramic materials) uses the method of direct electrical resistance, where electrodes, usually molybdenum, are placed into molten glass and a current is passed between them. The electrical resistivity of the glass is higher than that in the electrical circuit causing the glass to heat between the electrodes. Glass Batch comprised of various minerals, but predominantly silica sand, is fed on top of the molten glass and is heated until it melts, forming new glass.

Melting glass in this way is clean and relatively efficient compared with, for instance, gas melting. However, this method is still inefficient due to the heat losses. That is, the zone heated between the electrodes is relatively thin/shallow and relies upon conduction (and to a much lesser extent convection) to heat the glass batch above it. Glass is a poor conductor of heat and therefore melting glass in this way requires a shallow melt tank with a large surface area to obtain the quantity of glass required for a production process. Due to this the heat losses are large.

Alternative methods for heating glass include the use of heating elements. Heating elements have the advantage that the conductivity of the material being melted for example glass is generally irrelevant and allows melting from cold on a wide variety of materials with varying conductivities. Such heating elements comprise a conductor material. Upon passage of a current through the heating element, the resistance of the conductor material causes the heating element to heat up and subsequently heat the surrounding materials. Known heating elements exhibit several problems. One such problem is that differential resistance within the heating element, or across individual components of the heating element, can cause 'burn out' or oxidation of the heating element. For example heating elements, which include a collection of individual heating members clamped/coupled together, may be susceptible to such burn-out, with the clamping/coupling therebetween leading to a differential resistance. Similarly, heating elements with non-uniform dimensions (for example a thickness that differs by >3% across its length) may lead to differential resistance and burn-out.

A further problem is that, in known arrangements an array of heating elements, or individual components within a heating element, can produce a large magnetic field as they heat up. Such a magnetic field can cause the heating elements and/or the heating element array as a whole to deform.

It is desirable to provide an improved system for melting materials that mitigates the above problems.

BRIEF SUMMARY OF THE INVENTION

According to a first aspect of the invention, a heating element is provided for use in a system for melting materials during the production of a glass or ceramic material, the heating element comprising:
  a first coupling member configured to couple to a first side of the interior of a melt tank;
  a second coupling member configured to couple to a second side of the interior of the melt tank; and
  at least one elongate strip extending between the first coupling member and the second coupling member, wherein the at least one elongate strip is integral with the first coupling member and the second coupling member,
  wherein the heating element is configured such that during a heating operation, current flows between the first coupling member and the second coupling member of the heating element, along the at least one elongate strip to thereby radiate heat to materials located within the interior of the melt tank.

Aptly, the at least one elongate strip follows a non-linear path between the first and second coupling members.

Aptly, the at least one elongate strip is corrugated.

Aptly, the heating element comprises at least two elongate strips extending between the first coupling member and the second coupling member, wherein the at least two elongate strips are integral with the first coupling member and the second coupling member.

Aptly, the elongate axes of adjacent elongate strips within the heating element are substantially parallel, wherein the corrugations of the adjacent elongate strips are offset along their elongate axes.

Aptly, the heating elements are at least partially coated with a non-oxidising coating.

According to a second aspect of the invention, there is provided a system for melting materials during the production of a glass or ceramic material, the system comprising:
  a melt tank having an interior; and
  a heating element having:

a first coupling member coupled to a first side of the interior of the melt tank;

a second coupling member coupled to a second side of the interior of the melt tank; and at least one elongate strip extending between the first coupling member and the second coupling member, wherein the at least one elongate strip is integral with the first coupling member and the second coupling member;

wherein the heating element is configured such that current flows between the first coupling member and the second coupling member of the heating element, along the at least one elongate strip, to thereby radiate heat to materials located within the interior of the melt tank.

Aptly, the heating element of the second aspect of the invention is the heating element of the first aspect of the invention.

Aptly, the first side of the interior of the melt tank is opposed to the second side of the interior of the melt tank.

Aptly, the heating element is located in a position proximate to the base of the interior of the melt tank.

Aptly, the at least two elongate strips are spaced apart in a substantially horizontal direction within the heating element, during use of the heating element within the system.

Aptly, the system comprises at least two heating elements, each heating element comprising:

a first coupling member coupled to a first side of the interior of the melt tank;

a second coupling member coupled to a second side of the interior of the melt tank; and at least one elongate strip extending between the first coupling member and the second coupling member, wherein the at least one elongate strip is integral with the first coupling member and the second coupling member.

Aptly, the at least two heating elements are co-planar. More aptly, the at least two heating elements are co-planar in a plane substantially horizontal or parallel to a base of the interior of the melt tank.

Aptly, at least one of the at least two heating elements is positioned in a plane offset from another of the at least two heating elements. More aptly, the at least one of the heating elements is offset from the another of the at least two heating elements in the vertical direction.

Aptly, the system comprises a control system configured to control the current flow between the first coupling member and the second coupling member of the heating element.

Aptly, the control system is configured to control the at least two heating elements independently.

Aptly, the at least two heating elements are electrically coupled.

Aptly, the heating elements comprise or are formed from molybdenum or iridium.

According to a third aspect of the invention, the system of the second aspect is used for melting materials during the production of a glass or ceramic material.

According to a fourth aspect of the invention, there is provided a method for melting materials during the production of a glass or ceramic material, the method comprising:

providing a system comprising;

a melt tank having an interior; and a heating element having:

a first coupling member coupled to a first side of the interior of the melt tank;

a second coupling member coupled to a second side of the interior of the melt tank; and at least one elongate strip extending between the first coupling member and the second coupling member, wherein the at least one elongate strip is integral with the first coupling member and the second coupling member;

performing a heating operation comprising flowing current between the first coupling member and the second coupling member of the heating element, along the at least one elongate strip to thereby radiate heat to materials located within the interior of the melt tank.

Aptly, the system provided in the second aspect of the invention is the system according to the second aspect of the invention.

According to a fifth aspect of the invention, there is provided a method of producing the heating element of the first aspect of the invention, wherein the heating element is cut as an integral part using waterjet cutting.

Certain embodiments of the invention provide the advantage that an improved heating element for use in a system for melting materials during the production of a glass or ceramic material is provided.

Certain embodiments of the invention provide the advantage that the heating element is more reliable (i.e. less prone to burnout and oxidation).

Certain embodiments of the invention provide the advantage that the configuration of the heating element has been optimised to increase the heat output compared to known systems. In particular the output of IR/near IR radiation has been optimised.

Certain embodiments of the invention provide the advantage that an improved system for melting materials during the production of a glass or ceramic material is provided.

Certain embodiments of the invention provide the advantage that the system can melt materials, during the production of a glass or ceramic material, more efficiently than systems utilising direct electrical resistance. In particular, the system has reduced heat losses compared to known systems.

Certain embodiments of the invention provide the advantage that the system is less reliant on the conduction and/or convection of heat in comparison to systems utilising direct electrical resistance.

Certain embodiments of the invention provide the advantage that the system can utilise a smaller melt tank to achieve the quantities of molten glass or ceramic required for a continuous production process, in comparison to known systems.

Certain embodiments of the invention provide the advantage that an improved method for melting materials during the production of a glass or ceramic material is provided.

Certain embodiments of the invention provide the advantage that the method is more energy efficient than known methods.

For the avoidance of doubt, any of the features described herein apply equally to any aspect of the invention. Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

BRIEF DESCRIPTION OF THE DRAWINGS

Embodiments of the invention will now be described by way of example only with reference to the accompanying drawings in which:

FIGS. 1a and 1b illustrate perspective and plan views of a heating element, respectively;

FIGS. 2a and 2b illustrates cross-sectional views of a system, including the heating element of FIGS. 1a and 1b, taken along the width and length of a melt tank respectively;

DETAILED DESCRIPTION OF THE INVENTION

Figure 1C:
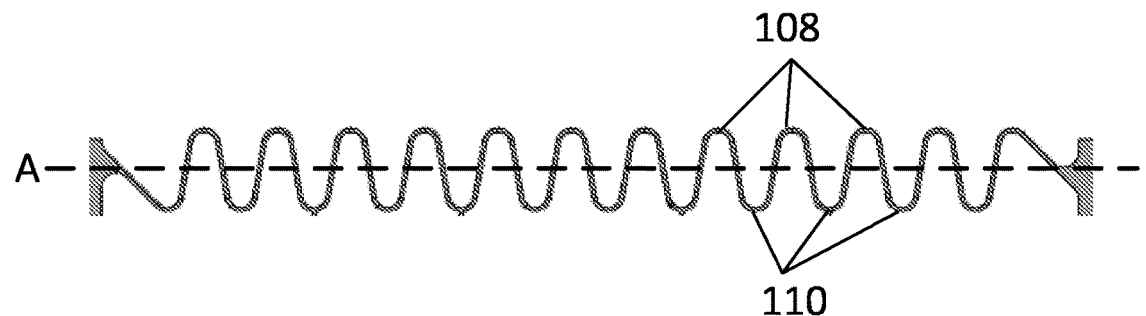
FIG. 1c illustrates an elongate strip of the heating element of FIGS. 1a and 1b.

Referring now to FIGS. 1a and 1b, a heating element 100 is illustrated for use in a system for melting materials during the production of a glass or ceramic material. The heating element 100 includes a first coupling member 102 configured to couple to a first side of the interior of a melt tank and a second coupling member 104 configured to couple to a second side of the interior of the melt tank.

The heating element 100 further includes at least one elongate strip extending between the first coupling member 102 and the second coupling member 104. In the illustrated example, the heating element 100 includes four elongate strips $106_{1-4}$.

As used herein, the term "strip" within the term "elongate strip" refers to a member having two surfaces, the surfaces being substantially parallel and separated through the thickness of the strip. Each surface has dimensions (for example, the surface having a length and a width) that are relatively large in comparison to the thickness of the strip (i.e. the thickness being the dimension of the strip that is substantially orthogonal to the dimensions of the heating surface of the strip). With regards to the strips described herein, the 'surfaces' are heating surfaces, configured to radiate heat therefrom.

As used herein, the term "elongate" within the term "elongate strip" indicates that a dimension of the strip (for example, the length of the strip) is elongated with respect to another dimension of the strip (for example, the width of the strip/the width of the heating surface of the strip). As discussed below, the elongated dimension is the length of the elongate strip extending between the first and second coupling members 102, which may or may not correspond to the length of the heating surfaces of the elongate strip.

In the illustrated examples, each elongate strip $106_{1-4}$ is elongated in the direction through which it extends between the first coupling member 102 and the second coupling member 104. That is, each elongate strip $106_{1-4}$ has an elongate axis (as indicated by axis A in FIG. 1c), extending between the first coupling member 102 and the second coupling member 104. The length of each elongate strip $106_{1-4}$ along the elongate axis is elongated with respect to the other dimensions of the elongate strip.

In some examples, each elongate strip $106_{1-4}$ may be straight, such that each elongate strip $106_{1-4}$ (and hence the heating surface thereof) follows the elongate axis. In other words, the length of the heating surfaces and the length of the elongate strip may be equal. However, in other examples (for example those illustrated) the heating surfaces of each elongate strip may not correspond directly to the elongate dimension of the elongate strip (for example, the heating surfaces are corrugated). In these examples, the path taken by the elongate strip in extending from the first coupling member 102 to the second coupling member 104 is non-linear and therefore does not directly follow the elongate axis of the elongate strip (as described further below with regards to the corrugated shape of the elongate strips). In this manner the elongated length of each strip is different to the length of its heating surfaces.

In the illustrated example, the elongate axes of the elongate strips $106_{1-4}$ within the heating element 100 are substantially parallel. The elongate axes (and the strips) are separated, with the elongate axes of the elongate strips in each heating element being co-planar.

The elongate strips $106_{1-4}$ are integral with the first coupling member 102 and the second coupling member 104. That is, the elongate strips $106_{1-4}$ form a single integral component with the first coupling member 102 and the second coupling member 104, in contrast to a collection of components coupled together, for example by a clamp.

In use, the heating element 100 performs a heating operation within a corresponding system for melting materials during production of a glass or ceramic material. To perform the heating operation, a potential difference is applied across the heating element 100, i.e. between the first coupling member 102 and the second coupling member 104, to induce a flow of current therebetween. In flowing between the first and second coupling members 102, 104, current flows along the elongate strips $106_{1-4}$.

The heating elements are made from an electrically conductive material, for example molybdenum or iridium. As current flows through the heating elements, the resistance of the heating elements (in particular the elongate strips) causes heat to be produced (i.e. Joule heating), to thereby radiate heat to materials located within the interior of the melt tank. The radiated heat causes the materials to melt.

It has been found that heat radiated to materials located within the interior of the melt tank in the form of infra-red (IR) or near-IR radiation is particularly effective at heating the materials. The IR or near-IR radiation passes easily through the molten product, for example molten glass. This allows the transmission of heat energy to the materials (for example glass batch) located above the molten glass, with a reduced reliance on conduction and convection. This in turn reduces the necessity for a shallow melt tank with a large surface area when melting sufficient quantities of glass for a production process. As a shallower tank can be used, with a smaller surface area, the heat losses are reduced, leading to a more efficient production process.

As used herein IR, including near-IR radiation, is defined as electromagnetic radiation having a wavelength of substantially from 700 nm to 1 mm and a frequency of from substantially 300 GHz to 430 THz. Near-IR, in particular, is generally considered to have a wavelength of 700 nm to 2500 nm or more aptly 780 nm to 2500 nm. From herein 'IR' refers to both IR and near IR frequencies.

The use of elongate strips within the heating elements provides an increased surface area compared to other shapes (for example, cylindrical rod-shaped electrodes/heating elements, which are typically used in known systems due to the strength provided). This increased surface area allows for an increased output of IR radiation. In other words, the heating surfaces of each elongate strip provide an increased heating/radiation surface from which IR radiation is emitted.

The use of an integral heating element 100 (i.e. a single integral component that can be electrically coupled to other parts of the system) helps reduce the differential resistance across different areas within the heating element 100. In this manner, the heating element 100 is less prone to burn-out than known systems.

In embodiments, the heating element 100 is integral by being produced from a single block/piece of material. For example, the heating element 100 may be produced by waterjet cutting or machine cutting. That is, a waterjet or a cutting tool is used to cut the heating element from a single block of material. In this example, the strips are cut from the block such that the width of each strip is substantially equal to the thickness of the block from which it is cut Such precision techniques of manufacture ensure that the geometry of the heating element 100 is suitably uniform (i.e. within a suitable tolerance) to help reduce differential resistances throughout the heating element 100. For example, when produced in this way the thickness of each elongate strip $106_{1-4}$ may be kept relatively constant across its length (for example within a tolerance of +/−0.5 mm). For example, waterjet cutting may allow tolerances of +/−0.1 mm to be achieved.

The use of waterjet cutting is particularly advantageous, in that the heating element can be produced relatively quickly (for example in comparison to the time taken to machine such an integral heating element).

In the illustrated example the elongate strips $106_{1-4}$ each follow a non-linear path between the first and second coupling members 102, 104. Specifically, in this example the elongate strip $106_{1-4}$ are corrugated.

In other words, the elongate strips $106_{1-4}$ include a series of peaks and troughs. It would be understood that the peaks and troughs are defined in relative terms. That is, for the elongate strips $106_{1-4}$ within a heating element, a peak faces a first direction (for example, one wall of the interior of the melt tank) and a trough faces the opposing direction (for example, a further, opposing wall of the interior of the melt tank). In the illustrated example, the first and second direction are substantially perpendicular to the elongate axis of the elongate strip.

In the illustrated example, the corrugations are curved in profile. That is, the corrugations follow a curved path. In this example, the non-linear path followed by each elongate strip $106_{1-4}$ is substantially sinusoidal, centred around the elongate axis of the corresponding elongate strip $106_{1-4}$. In other embodiments, the corrugations may be formed from a plurality of straight portions, arranged such that adjacent straight portions are angled with respect to each other. In other words, the non-linear path followed by each elongate strip may be a zigzag, centred around the elongate axis.

The corrugated shape of the elongate strips $106_{1-4}$ provides the advantage that the length of the heating surfaces of each elongate strip is increased (that is, the length of the heating surfaces of each elongate strip is increased beyond the distance between the first and second coupling members 102, 104). This increases the surface area of the heating surfaces of the elongate strips $106_{1-4}$, which leads to increased IR output. In addition, the increase in length also increases the resistance of each elongate strip. The voltage applied to heat the heating element to the desired temperature is therefore also increased. Configuring the heating element to be operational at higher applied voltages allows a greater degree of controllability of the heating element (that is, the heat output of the heating element is less sensitive to slight deviations in the applied voltage).

In some examples, the corrugations of adjacent elongate strips are offset along their elongate axes. That is, the peaks of a first elongate strip are not aligned with (offset from) the peaks of adjacent elongate strips (and in the same manner, the troughs of a first elongate strip are not aligned, i.e. offset, with the troughs of adjacent elongate strips). In other words, although the elongate axes of adjacent elongate strips are substantially parallel, the path followed by a first elongate strip is not parallel with the path followed by elongate axes of adjacent elongate strips.

By providing elongate strips that do not follow parallel paths (i.e. by offsetting the corrugations of adjacent elongate strips), the magnetic field generated by the heating element as it heats up is less strong than in heating elements with parallel components and hence deformation of the heating element is negated. This may also allow a greater number of elongate strips to be used in a single heating element (i.e. strips can be provided closer together without producing a prohibitively large magnetic field between strips).

In the illustrated example, the corrugations of adjacent elongate strips have the same frequency (i.e. the same numbers of peaks and troughs per unit length). The corrugations are offset along their elongate axes such that the peaks of a first elongate strip are aligned with the troughs of adjacent elongate strips (and vice versa). However, in other examples, the corrugations may be offset by different amounts than that illustrated.

Figure 2A:
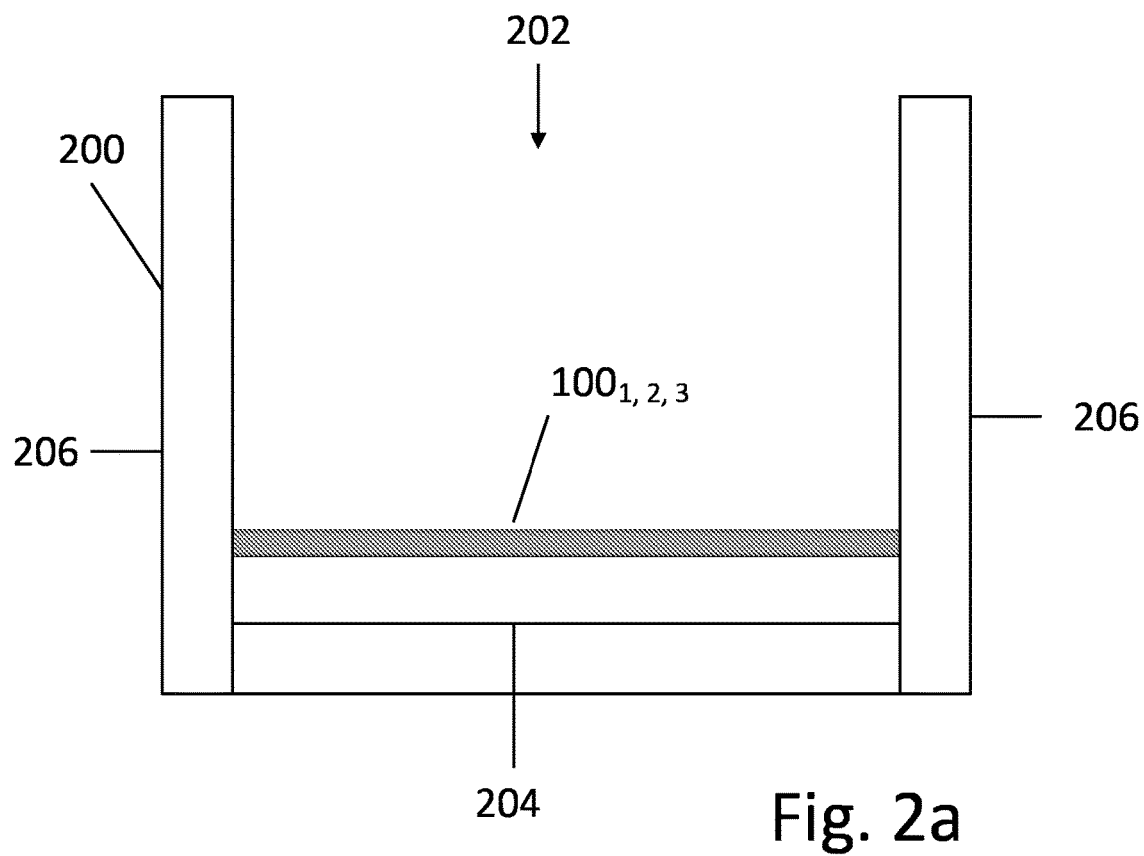
Figure 2C:
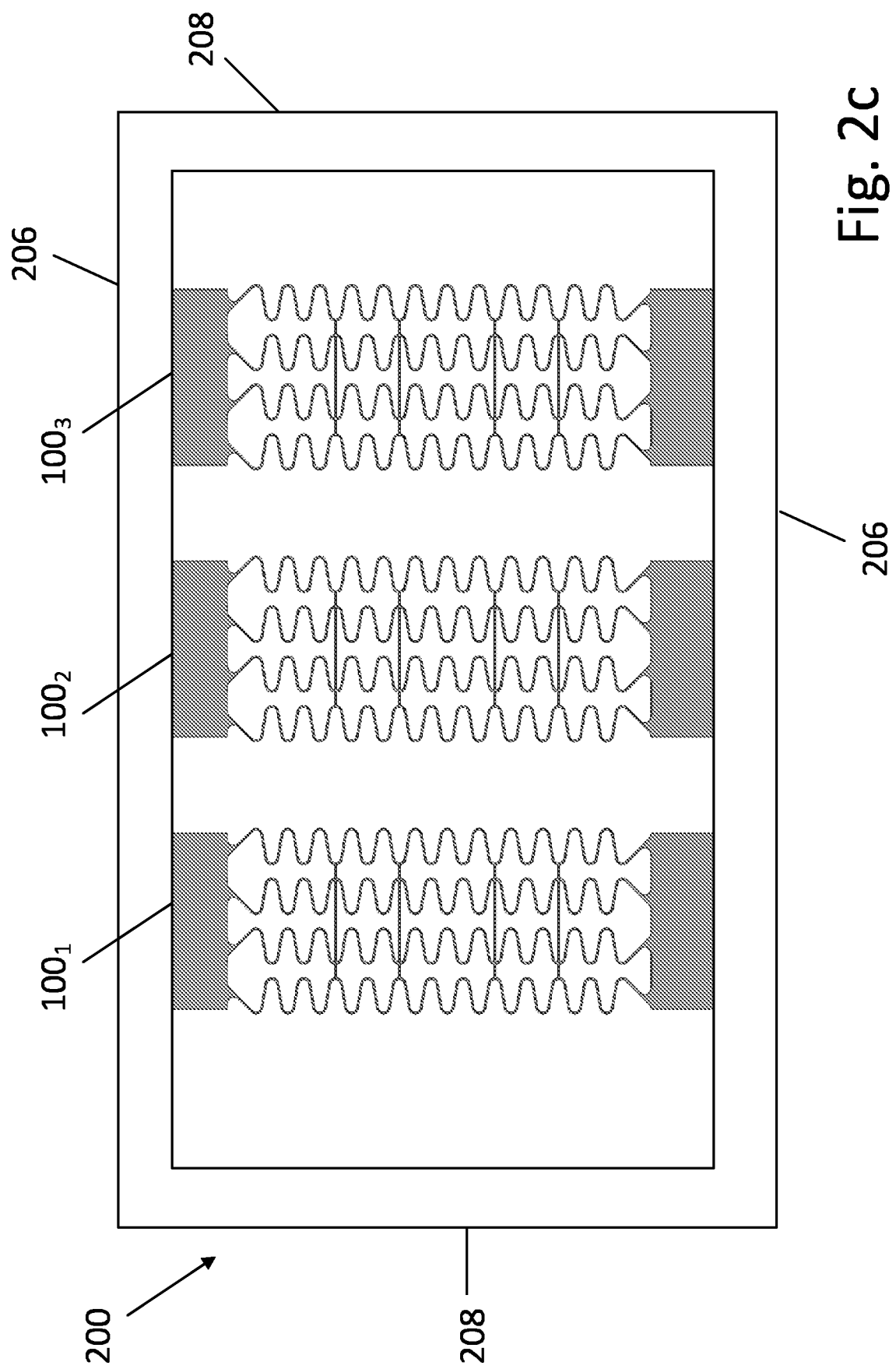
FIG. 2c illustrates a plan view of the system of FIGS. 2a and 2b.

Referring now to FIGS. 2a, 2b and 2c, a system is illustrated for melting material during the production of a glass or ceramic material.

The system includes a melt tank 200. The melt tank 200 may be any known melt tank. For example, the melt tank may include a structure of zircon refractory bricks lined with silimonite insulation blocks as is known in the art.

The melt tank has an interior 202. The interior 202 is configured to receive the materials to be melted. For example, the interior may receive glass 'batch' (a mix of constituent components of a glass) or glass pellets. The materials to be melted may be received within the interior of the melt tank in any suitable manner. For example, the material may be fed from a hopper, or similar, into the interior of the melt tank from above the melt tank. The materials may be fed in continuously or in one or more discrete amounts depending on the production use of the melt tank.

The interior 202 has a base 204 (i.e. internal base). Although not shown in the Figures, the base is sloped downwardly towards an outlet (not shown) to aid the flow of the molten product towards the outlet. However, in other examples the base may extend horizontally (i.e. without a slope). The interior is enclosed by sides. In this case, the melt tank is rectangular in profile and therefore has two longer sides 206 defining the length of the tank and two shorter sides 208 defining the width of the tank (the width of the tank being shorter than the length of the tank). The outlet is typically located in a side 208, defining the width of the tank (i.e. the base is sloped along the length of the tank). In other examples, the outlet may be located elsewhere (e.g. in a side 206 defining the length of the tank).

The system further includes at least one heating element 100, according to any of the previously described examples (and any described variations thereof). In the illustrated example of FIGS. 2a, 2b and 2c, the system includes an array of heating elements, including three heating elements $100_{1-3}$. It would be understood that the system may have any number of heating elements according to a number of factors (for example, the size of the tank interior and/or the required heat output, which may itself depend on the materials to be melted, the required output of melted product, for example).

As shown in FIG. 2c, the first coupling member 102 of each heating element $100_{1-3}$ is coupled to a first side of the interior of the melt tank and the second coupling member 104 of each heating element $100_{1-3}$ is coupled to a second, opposing, side of the interior of the melt tank. In this example, the first and second sides are opposed across the width (i.e. the shorter dimension) of the interior of the melt tank. In this manner, the heating elements are less susceptible to deformation under self-weight than if the heating elements extended across the longer dimension of the melt tank.

In this example, the heating elements are arranged substantially horizontally within the interior of the melt tank. In other words, each heating element is arranged such that the plane of each heating element, including the elongate axes of the elongate strips therein, is arranged substantially horizontally within the interior of the melt tank.

In other words, the heating elements are arranged within the interior of the melt tank such that the width of the elongate strips within each heating element is arranged substantially vertically and the peaks/troughs of the corrugations face the sides 206, 208 defining the width of the tank.

In alternative embodiments, the elements may be arranged parallel to the base of the interior of the melt tank. In other words, the plane of each heating element including the elongate axes of said plane, is arranged substantially parallel to the base of the interior of the melt tank. In this case, the elongate strips within each element still extend substantially horizontally across the width of the interior of the melt tank.

In the illustrated example, the heating elements are co-planar. That is, the planes of each heating element are coincident. However, in alternative embodiments, the heating elements may be arranged in other ways. For example, at least one of the heating elements may be positioned in a plane offset from the other heating elements (for example, there may be two heating elements, one parallel and offset vertically from the other).

The heating elements $100_{1-3}$ are located in a position proximate to (i.e. close to or adjacent to) the base of the interior of the melt tank. For example, the heating elements may be located from substantially 10 mm to 100 mm from the base of the tank. The molten glass is intended to flow down through the heating element, with the drain being lower than the elements within the tank. To avoid overheating at the base of the tank there is generally an optimum position for location of the heating elements. For example, the optimum position may be between 50 and 70 mm from the base of the tank, more aptly 60 mm from the base of the tank.

The heating elements may be coupled to the tank in any suitable way. For example, the heating elements may be held in position by the brick/block work of the tank. That is, the heating elements may be built into the tank, such that they cannot be removed or separately inserted.

In the example illustrated in FIG. 2c, the heating elements $100_{1-3}$ are coupled to the melt tank 200 in such a manner that the first and second coupling members 102, 104 of each heating element is exposed within the interior of the melt tank. It has been found that the areas of the interior of the tank proximate to the walls are areas in which heating elements/electrodes are most likely to oxidise or corrode. By positioning the heating elements in this manner, the risk of oxidation/corrosion to the elongate strips is reduced. However, in alternative examples, the heating elements $100_{1-3}$ may be coupled to the melt tank 200 such that only the elongate strips are exposed within the interior of the melt tank or coated with a corrosion/oxidation resistant material such as for instance platinum or iridium.

In some examples, the system includes a control system for controlling the current flow between the first coupling member and the second coupling member of the heating elements $100_{1-3}$. The control system controls the current flow between the first coupling member and the second coupling member by controlling the potential difference between the first coupling member and the second coupling member.

The heating elements may be coupled to the control system in any suitable manner. For example, a cable may connect the heating elements to the control system. The cable may be bolted to the heating elements. The cable may be water-cooled.

The control system is coupled to a power source, for example a 415V power source. The power source further includes a transformer, configured to transform the voltage supplied from the power source to the required level as determined by the control system.

The control system may include a user interface, which allows a user to provide instructions to the control system prior to/during operation. In other embodiments (or in addition), the control system may operate according to pre-programmed instructions.

For example, the system may initially be controlled manually. The manual control may continue until monitored parameters become relatively constant, at which point the control of the control system may be passed to a computer, which operates according to pre-programmed instructions.

In some examples, the heating elements are controlled independently. That is, the flow of current through each heating element may be controlled and varied independently. Independent control may be achieved through a single control system, which can operate each heating element independently, or an independent control system for each heating element. The independent control of the heating elements allows the heat output (i.e. the emitted IR radiation) to be varied in the different locations within the tank. For example, the current flow through each heating element and hence the heat output from each heating element may correspond to its relative distance from the outlet of the melt tank. For example, the heating elements further from the outlet may have a higher heat output relative to those nearer the outlet, as required. This allows greater control over the temperature gradient of molten product within the melt tank.

As referred to previously, the above described configuration allows a tank with a reduced surface area compared to known systems to be used to provide molten product within a continuous production process. For example, the interior of the melt tank may have a width of from 400 mm to 600 mm. The interior of the melt tank may have a length of 700 mm or more. That is, the above described concept may be scaled up by increasing the length of the melt tank to any required value.

The heating elements may have a width of from 200 mm to 400 mm, with this width depending on the number of elongate strips present in a heating element and the spacing between the elongate strips.

The elongate strips of each heating element may have a thickness of between 2 and 4 mm, for example. The elongate strips of each heating element may have a width (corresponding to the height of the heating element) of between 10 and 30 mm, aptly 16 mm.

For a melt tank and heating element arrangement as described above, the applied potential difference between the ends of individually controlled heating elements is from substantially 1.5 to 3 V. The resulting power consumption for a tank as described above (with three heating elements), is typically from 40 kW to 100 kW in producing a continuous stream of molten glass of 1-4 kg/minute.

In embodiments, two or more of the heating elements may be electrically coupled. In electrically coupling the heating elements, the heating elements may be operated in series. That is a coupling member of a first heating element is electrically coupled to a coupling member of a second heating element and a potential difference is applied between the un-coupled ends of the coupled heating elements. In operating the heating elements in series, the resistance is increased (i.e. approximately doubled), such that an increased applied voltage is required (i.e. approximately double). The requirement for an increased voltage to achieve the desired heating effect provides greater controllability for a user (i.e. the system is less sensitive to fluctuations in voltage).

The coupled heating elements may be those arranged in a co-planar arrangement. For example, two or more of the heating elements of FIG. 2c may be electrically coupled. In another variation, heating elements arranged in separate planes may be coupled.

Figure 3:
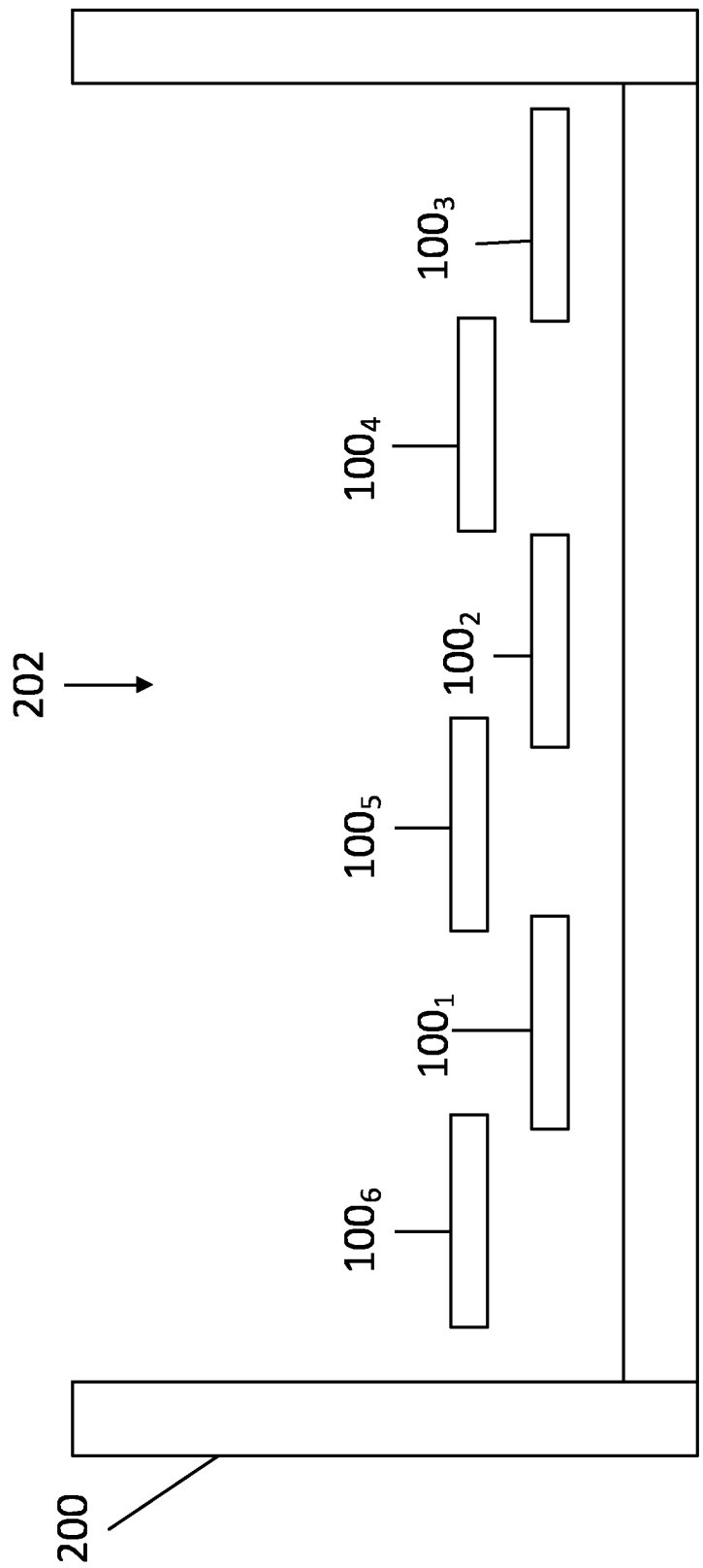
FIG. 3 illustrates a cross-sectional view of another system including heating elements.

For example, FIG. 3 illustrates a variation on the system of FIGS. 2a to 2c. In this example, the system includes heating elements $100_{1-3}$ co-planar in a first plane (in the same manner as for the system of FIGS. 2a to 2c).

In addition, the system includes at least one further heating element (in this example three further heating elements $100_{4-6}$) offset from the common plane. In this example, the further heating elements $100_{4-6}$ are co-planar in a second plane, with the second plane being parallel with, but offset from, the first plane. The second plane is offset from the first plane in the vertical direction.

In this example, a heating element located in the first plane is electrically coupled with a corresponding heating element located in the second plane. That is, the heating element located in the first plane is operated in series with the corresponding heating element in the second plane.

Each set of electrically coupled heating elements may be controlled independently in the manner described above.

The offset planes may be arranged in any suitable manner. For example, each heating element of the heating elements $100_{4-6}$ may be located directly above a corresponding heating element $100_{1-3}$. In alternative embodiments (as per the illustrated example, the heating elements $100_{4-6}$ may be offset from the heating elements $100_{1-3}$ in a substantially horizontal direction.

Various modifications to the detailed arrangements as described above are possible. For example, it would be appreciated that although the described examples refer only to the melting of a material to produce a molten glass, the above apparatus may also be used in melting of materials in the production of a ceramic material.

Although the above described heating element example (i.e. with corrugations of adjacent elongate strips having the same frequency being offset) is particularly advantageous in reducing the magnetic attraction between adjacent elongate strips, it would be understood that any variation from parallel of adjacent elongate strips will help assist in reducing the magnetic attraction. For example, the corrugations of adjacent strips may be offset by any amount and/or the corrugation frequency of adjacent strips may be different.

In embodiments, the heating elements are at least partially coated. For example, the heating elements may be at least partially coated with a material that prevents oxidation. Any suitable coating material may be used, for example an iridium coating or a platinum coating. A coating is particularly advantageous for molybdenum heating elements, which can be susceptible to oxidation, which causes degradation of the heating elements.

The coating may cover the entirety of the heating element or at least the portion of the heating element exposed within the interior of the tank. As mentioned previously, heating elements can be most prone to oxidation/corrosion close to the interior walls of the melt tank. As such, the heating elements may be coated only in the areas proximate to the interior walls of the melt tank. In such cases, it may be only the first and second coupling member (or a portion thereof) that is coated, or a portion of the elongate strips.

For example, the coated region at each end of the heating element may extend from the interior wall of the melt tank across from 5% to 30% of the width of the interior of the melt tank, aptly from 10% to 20% of the width of the interior of the melt tank.

It would be understood that the elongate strips within each heating element may be oriented in any suitable way. Similarly, the heating elements may be oriented in any suitable way. Any suitable arrangement of heating elements within the tank may be used.

It will also be appreciated by those skilled in the art that any number of combinations of the aforementioned features and/or those shown in the appended drawings provide clear advantages over the prior art and are therefore within the scope of the invention described herein.

The schematic drawings are not necessarily to scale and are presented for purposes of illustration and not limitation. The drawings depict one or more aspects described in this disclosure. However, it will be understood that other aspects not depicted in the drawings fall within the scope of this disclosure.

The invention claimed is:

1. A system for melting materials during the production of a glass or
    ceramic material, the system comprising:
    a melt tank having an interior; and
    a heating element for positioning within molten materials in the interior of the melt tank, the heating element having:
    a first coupling member coupled to a first side of the interior of the melt tank;
    a second coupling member coupled to a second side of the interior of the melt tank; and
    at least two elongate strips extending between the first coupling member and the second coupling member, wherein the at least two elongate strips are integral with the first coupling member and the second coupling member, and wherein the at least two elongate strips are spaced apart within the heating element;
    wherein the heating element is configured such that current flows between the first coupling member and the second coupling member of the heating element, along the at least two elongate strips, to thereby radiate heat to materials located within the interior of the melt tank.

2. The system according to claim 1, wherein the at least two elongate strips follow a non-linear path between the first and second coupling members.

3. The system according to claim 2, wherein the at least two elongate strips are corrugated.

4. The system according to claim 3,
    wherein the elongate axes of adjacent elongate strips within the heating element are substantially parallel; and
    wherein the corrugations of the adjacent elongate strips are offset along their elongate axes.

5. The system according to claim 1, heating element is at least partially coated with a non-oxidizing coating.

6. The system according to claim 1, wherein one or more of:
the at least two elongate strips of the heating element follow a non-linear path between the first and second coupling members;
the at least two elongate strips of the heating element are corrugated and follow a non-linear path between the first and second coupling members;
the elongate axes of adjacent elongate strips within the heating element are substantially parallel, and wherein the corrugations of the adjacent elongate strips are offset along their elongate axes; and
the heating element is at least partially coated with a non-oxidizing coating.

7. The system according to claim 1, wherein the first side of the interior of the melt tank is opposed to the second side of the interior of the melt tank.

8. The system according to claim 1, wherein the heating element is located in a position proximate to the base of the interior of the melt tank.

9. The system according to claim 1, wherein the system further comprises at least one additional heating element such that the system comprises at least two heating elements and wherein the at least two heating elements are co-planar in a plane substantially horizontal or parallel to a base of the interior of the melt tank.

10. The system according to claim 1, wherein the system further comprises at least one additional heating element such that the system comprises at least two heating elements and wherein at least one of the at least two heating elements is positioned in a plane offset from another of the at least two heating elements.

11. The system according to claim 1 further comprising a control system configured to control the current flow between the first coupling member and the second coupling member of the heating element.

12. The system according to claim 1, wherein the system further comprises at least one additional heating element such that the system comprises at least two heating elements, the system further comprising a control system configured to control the current flow between the first coupling member and the second coupling member of the heating element;
wherein the control system is configured to control the at least two heating elements independently.

13. The system according to claim 1, wherein the system further comprises at least one additional heating element such that the system comprises at least two heating elements, the system further comprising a control system configured to control the current flow between the first coupling member and the second coupling member of the heating element;
wherein the at least two heating elements are electrically coupled.

14. A method for melting materials during the production of a glass or
ceramic material, the method comprising:
providing a system comprising:
a melt tank having an interior; and
a heating element for positioning within molten materials in the interior of the melt tank, the heating element having:
a first coupling member coupled to a first side of the interior of the melt tank;
a second coupling member coupled to a second side of the interior of the melt tank; and
at least two elongate strips extending between the first coupling member and the second coupling member, wherein the at least two elongate strips are integral with the first coupling member and the second coupling member and wherein the at least two elongate strips are spaced apart within the heating element; and
performing a heating operation comprising flowing current between the first coupling member and the second coupling member of the heating element, along the at least two elongate strips to thereby radiate heat to materials located within the interior of the melt tank.

15. The method according to claim 14, wherein one or more of:
the at least two elongate strips of the heating element follow a non-linear path between the first and second coupling members;
the at least two elongate strips of the heating element are corrugated and follow a non-linear path between the first and second coupling members;
wherein the elongate axes of adjacent elongate strips within the heating element are substantially parallel, and wherein the corrugations of the adjacent elongate strips are offset along their elongate axes;
the heating element is at least partially coated with a non-oxidizing coating;
the first side of the interior of the melt tank is opposed to the second side of the interior of the melt tank;
the heating element is located in a position proximate to the base of the interior of the melt tank;
the system further comprises at least one additional heating element such that the system provides at least two heating elements, wherein the at least two heating elements are co-planar in a plane substantially horizontal or parallel to a base of the interior of the melt tank;
wherein at least one of the at least two heating elements is positioned in a plane offset from another of the at least two heating elements;
the system further comprises a control system configured to control the current flow between the first coupling member and the second coupling member of the heating element;
wherein the control system is configured to control the at least two heating elements independently; and
wherein the at least two heating elements are electrically coupled.

* * * * *